(12) United States Patent
Cochran (10) Patent No.: US 7,306,200 B2
(45) Date of Patent: Dec. 11, 2007

(54) CONTROLLED RATE FEEDER SYSTEMS FOR FINE PARTICLE SOLIDS AND METHODS THEREOF

(75) Inventor: Joe W. Cochran, Palm Harbor, FL (US)

(73) Assignee: Progress Materials, Inc., St. Petersburg, FL (US)

( * ) Notice: Subject to any disclaimer, the term of this patent is extended or adjusted under 35 U.S.C. 154(b) by 0 days.

(21) Appl. No.: 11/136,776

(22) Filed: May 25, 2005

(65) Prior Publication Data

US 2006/0266970 A1 Nov. 30, 2006

(51) Int. Cl.
*F16K 25/00* (2006.01)
*F16K 3/00* (2006.01)
*B65B 1/30* (2006.01)

(52) U.S. Cl. .................. 251/195; 141/192; 251/231; 251/326

(58) Field of Classification Search .............. 251/195, 251/231, 326, 327, 296; 141/192, 69, 70, 141/48
See application file for complete search history.

(56) References Cited

U.S. PATENT DOCUMENTS

| | | | | |
|---|---|---|---|---|
| 1,783,329 A | * | 12/1930 | Edmonds | 251/176 |
| 1,836,374 A | * | 12/1931 | Kelly | 137/584 |
| 2,660,191 A | * | 11/1953 | Volpin | 251/327 |
| 3,123,090 A | * | 3/1964 | Bredtschneider | 137/112 |
| 3,197,261 A | * | 7/1965 | Kauffman | 406/124 |
| 3,799,219 A | * | 3/1974 | Uth et al. | 141/39 |
| 4,483,514 A | * | 11/1984 | Kennedy | 251/327 |
| 5,445,194 A | * | 8/1995 | Clusserath | 141/39 |
| 5,836,569 A | * | 11/1998 | Wurangian | 251/327 |
| 5,895,028 A | * | 4/1999 | Varady | 251/205 |
| 2004/0255771 A1 | * | 12/2004 | Tsubouchi et al. | 91/376 R |

* cited by examiner

*Primary Examiner*—Gregory Huson
*Assistant Examiner*—Andrew J Rost
(74) *Attorney, Agent, or Firm*—Nixon Peabody LLP (57) ABSTRACT

A controlled rate feeder system for fine particle solids and a method thereof includes a seat-and-backseat structure, a seat plate assembly, a backseat plate assembly, at least one biasing device, and an actuator assembly. The seat-and-backseat structure has an inlet and an outlet which are connected together by at least one passage. The seat plate assembly is moveable to any position between covering and exposing the inlet. The backseat plate assembly is positioned adjacent to and moveable with the seat plate assembly. At least one biasing device is positioned between the seat plate assembly and the backseat plate assembly which biases the seat plate assembly and the backseat assembly apart. The biasing device also biases the seat plate assembly against an inner surface of the seat-and-backseat structure and the backseat plate assembly against another inner surface of the seat-and-backseat structure. The actuator assembly moves the seat plate assembly to any position between covering and exposing the inlet.

38 Claims, 8 Drawing Sheets

CONTROLLED RATE FEEDER SYSTEMS FOR FINE PARTICLE SOLIDS AND METHODS THEREOF

FIELD OF THE INVENTION

This invention generally relates to feeder systems and methods and, more particularly, to a controlled rate feeder system for fine particle solids and methods thereof.

BACKGROUND

Many processes require controlled, variable rate feeding of fine particle solids into various process units. Many methods of accomplishing this are well known, but all exhibit substantial negative aspects.

Feeders for fine solids can generally be divided into those that feed the material in the deaerated state and those that require aeration to aid material flow. Some examples of deaerated fine solids feed devices are vibrating feeders, variable speed belt feeders, variable speed screw feeders, and variable speed screw feeders with flow enhancing features, such as conditioning mixers or augers.

Unfortunately, there are undesirable characteristics associated with each of these types of existing feeders. For example, vibrating feeders have poor control of feed rate and are prone to flooding with fluidizable solids resulting in uncontrollable flow through the feeder. Variable speed belt feeders are expensive and also are prone to flooding with fluidizable solids. Variable speed screw feeders sometimes have erratic mass flows as the density of the solids changes depending on feed hopper design, are prone to flooding with fluidizable solids, and are prone to leakage through shaft seals. Variable speed screw feeders with flow enhancing features are expensive and often require very tall "mass flow" hoppers to maintain constant speed vs. mass flow characteristics. Additionally, all of the feeders are prone to leakage through shaft seals.

Aeration of fine solids, for example by use of air slides or other fluidizing devices in the hopper above the fine solids feed device, can produce much more uniform solids densities so that volumetric feeders can provide more constant mass flow rates. The only widely used example of a fine solids feed device requiring aeration of the solids is the variable speed rotary feeder or "star" feeder. These devices produce good flow control and are reliable.

Unfortunately, these variable speed rotary feeders are expensive and have poor wear characteristics resulting in frequent need for repair or replacement. In addition, as these rotary feeders wear, the close tolerances that give them good feed rate control are lost. As these close tolerance fits widen with wear, solids leak through them at an increasing rate. Because of this, the variable speed controls must turn the rotary feeders ever more slowly to maintain a constant feed rate as wear increases. Often, worn rotary feeders cannot maintain the feed rate accuracy needed for the process being fed. In addition, rotary feeders have shaft seals that often leak solids to the surrounding environment as wear increases.

SUMMARY

A feeder system in accordance with embodiments of the present invention comprises a seat-and-backseat structure, a seat plate assembly, a backseat plate assembly, at least one biasing device, and an actuator assembly.

The seat-and-backseat structure has an inlet and an outlet which are connected together by at least one passage. The seat plate assembly is moveable to any position between covering and exposing the inlet in the seat-and-backseat structure. The backseat plate assembly is positioned adjacent to and moveable with the seat plate assembly. At least one biasing device is positioned between the seat plate assembly and the backseat plate assembly which biases the seat plate assembly and the backseat assembly apart. The biasing device also biases the seat plate assembly against an inner surface of the seat-and-backseat structure and the backseat plate assembly against another inner surface of the seat-and-backseat structure. The actuator assembly moves the seat plate assembly to any position between covering and exposing the inlet.

A method for making a feeder system in accordance with embodiments of the present invention comprises providing a seat-and-backseat structure with an inlet and an outlet which are connected together by at least one passage. A seat plate assembly is positioned in the seat-and-backseat structure to be moveable to any position between covering and exposing the inlet. A backseat plate assembly is positioned in the seat-and-backseat structure adjacent to and moveable with the seat plate assembly. The seat plate assembly and the backseat assembly are biased apart with a biasing device that biases the seat plate assembly against an inner surface of the seat-and-backseat structure and the backseat plate assembly against another inner surface of the seat-and-backseat structure. An actuator assembly is provided to move the seat plate assembly to any position between covering and exposing the inlet.

The present invention provides a number of advantages over other prior art types of feeders including providing a feeder system which has excellent wear characteristics. Typically, after months of continuous operation, wear parts of this feeder system, such as the seat, seat plate, backseat and backseat plate, will only show slight wear. As a result, typical wear will have little, if any, negative effect on the performance of this feeder system. By comparison, other prior art feeders operating for similar periods of time and under similar conditions would be worn to the point of requiring replacement.

The present invention also provides a feeder system which has minimal feed hopper requirements. Since in some embodiments of the present invention the fine particle solids are aerated to the proper state for feeder operation, the only requirement for the feed hopper is that the material flow freely into the feeder inlet. Neither tall, expensive mass flow design hoppers nor hopper aeration beyond that necessary to get the solids to the feeder inlet are necessary.

Additionally, the present invention provides a feeder system which has excellent positive flow cutoff. With the present invention, the seat plate has a large overlap over the seat cutout and the high spring loading of the seat assembly and backset assembly provide an excellent shutoff when no flow is desired. Even if the feed material becomes excessively fluidized, this tight shutoff precludes flooding or similar problems in the feeder system.

Further, the present invention provides a feeder system which can be manufactured at a reasonable cost. The cost of the feeder system in accordance with the present invention is very reasonable because the feeder system is designed to be fabricated from simple shapes cut from commonly available steel sections that are welded together without excessive precision requirements. By comparison, prior rotary feeders require more moving parts machined to precise tolerances, complex shapes and expensive materials. Typically, these prior rotary feeders would cost about three to four times as much to manufacture as the present invention.

DETAILED DESCRIPTION

Figure 1:
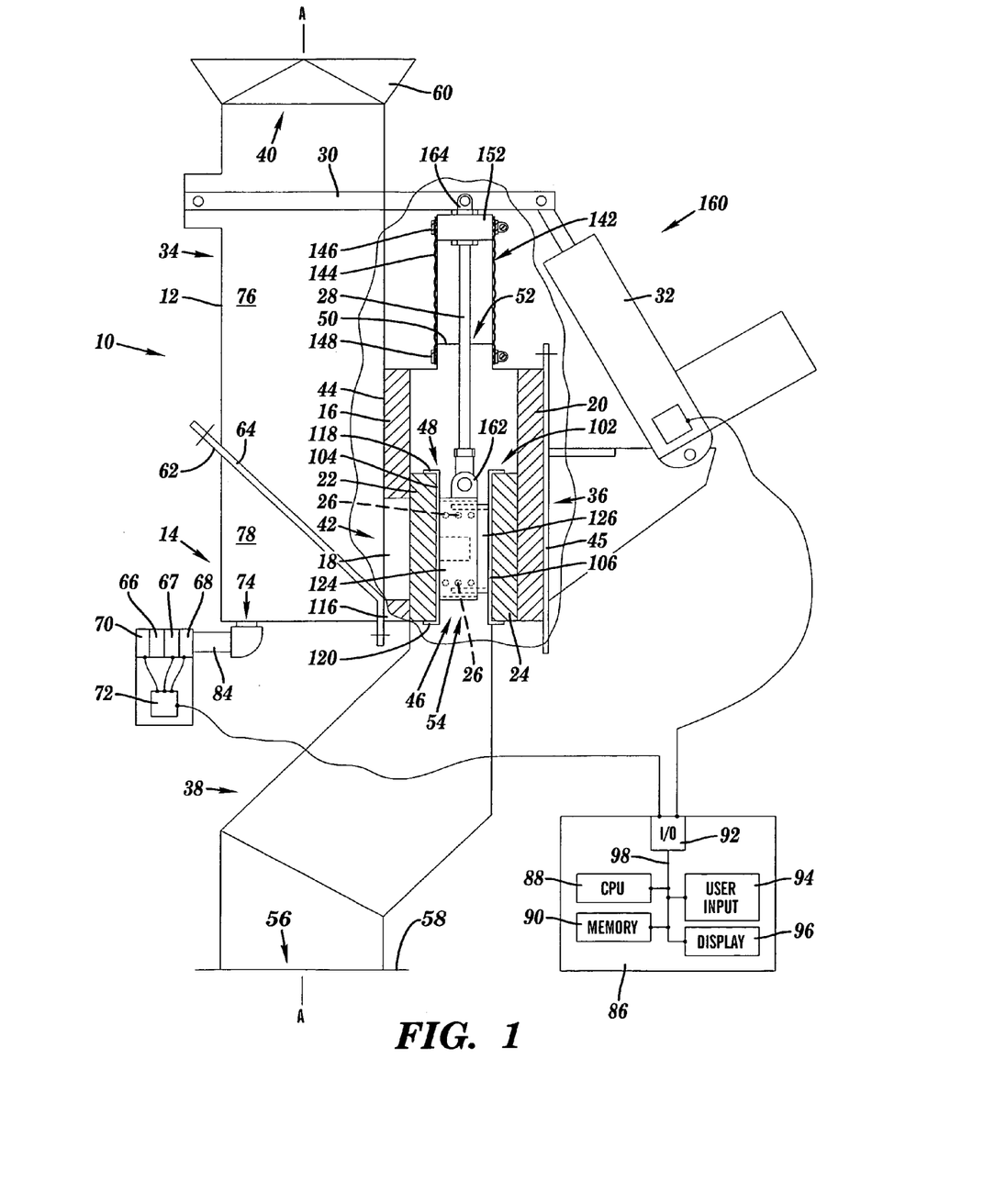
FIG. 1 is a side, partial cross-sectional, partial cut-away view of a feeder system with the seat plate in a closed position in accordance with the embodiments of the present invention.
Figure 2:
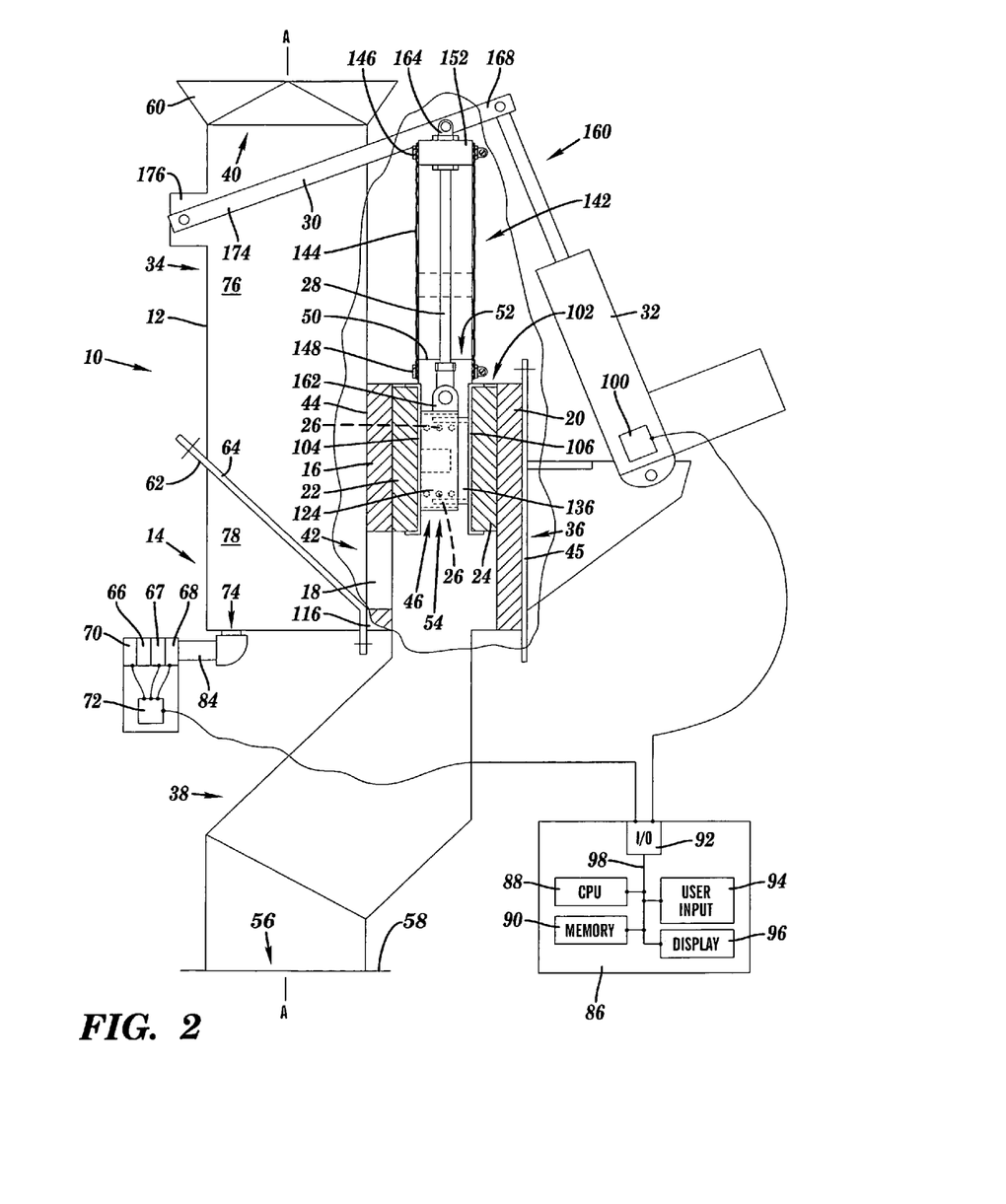
FIG. 2 is a side, partial cross-sectional, partial cut-away view of the feeder system shown in FIG. 1 with the seat plate in an open position.

A feeder system 10 for fine particle solids, such as fly ash, in accordance with embodiments of the present invention is illustrated in FIGS. 1 and 2. The feeder system 10 includes feeder body or housing 12, an aeration assembly 14, a seat 16 with a cutout or inlet 18, a backseat 20, a seat plate 22, a backseat plate 24, a spring 26, an actuator rod 28, an actuator lever 30, and an actuator 32, although the feeder system 10 can comprise other numbers and types of elements in other configurations. The present invention provides a controlled rate feeder system 10 which has excellent wear characteristics, provides well controlled, consistent feeding of fine particle solids, has minimal feed hopper requirements, has excellent positive flow cutoff, and can be manufactured at a reasonable cost Referring more specifically to FIGS. 1 and 2, the feeder body or housing 12 comprises an inlet housing 34, a seat-and-backseat housing 36 and an outlet housing 38, although the feeder housing 12 can comprise other numbers and types of housings or structures in other configurations. The inlet housing 34 is an elongated four-sided structure with a substantially square cross-sectional shape and with a feeder inlet 40 and an opening 42 in a plate 44 to the inlet 18, although the inlet housing 34 could have other numbers of sides and other shapes and configurations.

The seat-and-backseat housing 36 is an elongated, rectangular shaped structure which is connected to the plate 44 of the inlet housing 34 and surrounds the seat 16, backseat 20, seat plate 22, and backseat plate 24, although the seat-and-backseat housing 36 could have other numbers of sides and other shapes and configurations. One of the sides of the seat-and-backseat housing 36 comprises a plate 45 against which the backseat 20 rests. This plate 45 is attached to the remainder of the seat-and-backseat housing 36 via a bolted flange arrangement. Another plate 50 is connected to the plate 45, seals the top of the seat-and-backseat housing 36, and is connected along one edge to the plate 44. As shown in FIG. 1, the plate 50 has an aperture 52 that provides sufficient spacing for the actuator rod 28 to extend and move through.

Referring back to FIGS. 1 and 2, the outlet housing 38 is an elongated four-sided structure with an angled configuration and with an opening 54 connected to the outlet 46 between the seat 16 and the backseat 20 and a feeder outlet 56 that has a flange 58, although the outlet housing 38 could have other shapes and configurations. The outlet housing 38 has the angled configuration so the feeder inlet 40 and the feeder outlet 56 are substantially collinear along an axis A-A, although the feeder inlet 40 and feeder outlet 56 can have other orientations. With this substantially collinear orientation, the feeder housing 12 can be directly bolted in to replace a prior art rotary feeder and its inlet pipe, although the feeder inlet 40 and the feeder outlet 56 can have other orientations. Additionally, with the shape and configuration for the inlet housing 34, seat-and-backseat housing 36, and outlet housing 38 described above, the feeder housing 12 can easily be made from flat plate pieces of material, such as steel, for an economical cost, although the feeder housing 12 can be made of other numbers and types of elements in other shapes and configurations and from other materials.

Figure 3:
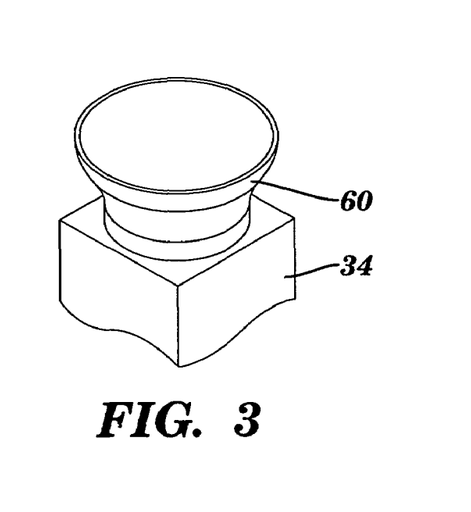
FIG. 3 is a perspective view of an inlet assembly for the feeder system shown in FIGS. 1 and 2.
Figure 4:
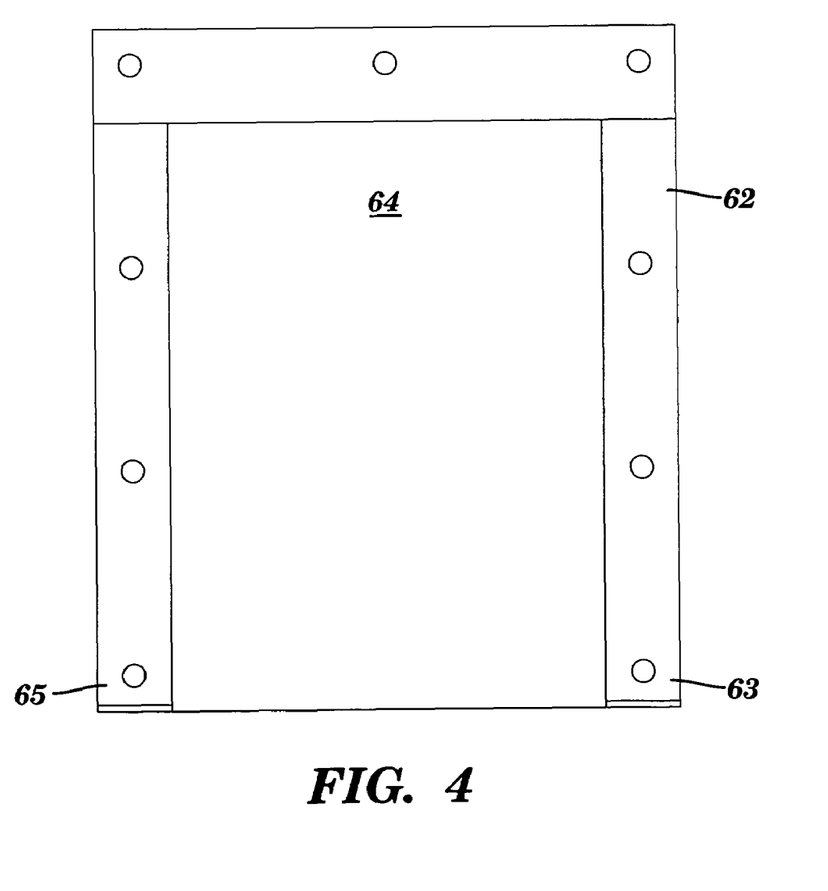
FIG. 4 is a top view of a bottom plate for an aeration assembly for the feeder system shown in FIGS. 1 and 2.

Referring to FIG. 3, a round-to-square inlet transition device 60 is connected to the feeder inlet 40 of the inlet housing 34 for the feeder housing 12, although the feeder housing 12 can have other types of transition devices. The round-to-square inlet transition device 60 enables the feeder housing 12 to be easily coupled to a standard round pipe.

Referring to FIGS. 1-5, the aeration assembly 14 is used to aerate or partially fluidize the fine particle solid feed to a substantially constant and consistent density in the inlet housing 34. The aeration assembly 14 is located adjacent to the inlet 18 in the seat 16, although the aeration assembly 14 could be in other locations, such as in a hopper above the feeder housing 12. The aeration assembly 14 comprises a flange 62, an aeration membrane 64, a manual control valve 66, a solenoid operated valve 67, a variable-area flow-meter 68, a fluid source 70, and an aeration control system 72, although the aeration assembly 14 can comprise other numbers and types of elements in other configurations.

Referring more specifically to FIGS. 1-4, the flange 62 extends around and is secured to three sides of an inner surface of the inlet housing 34, although the flange 62 could have other shapes and configuration and can be connected in other manners, such as with welds and/or bolts. The flange 62 is connected to the inlet housing 34 to slope down with the ends 63 and 65 of the flange 62 secured to the inlet housing 34 adjacent a lower edge of the inlet 18 in the seat 16, although the flange 62 can be connected in other manners.

An aeration membrane 64 extends across and is secured to the flange 62 to divide the inlet housing 34 into separate compartments 76 and 78, although the aeration membrane 64 can be connected in other manners and other types of aeration system can be used. In these embodiments, the aeration membrane 64 is a fabric, although other types of aeration membranes can be used, such as a metal mesh or a sintered metal as required for the temperature of the fine particle solids. The aeration membrane 64 is permeable so that a fluid, such as air, can pass through from one compartment 76 to the other compartment 78 in the inlet housing 34 to aerate or fluidize the fine particle solids in the compartment 78. The pressure drop of the aeration air or other fluid across the aeration membrane 64 helps to provide uniform, small bubble flow of aeration air at all locations across the aeration membrane 64. When the aeration air or other fluid is off, the aeration membrane 64 keeps the fine particle solids from flowing into the aperture 74.

Figure 5:
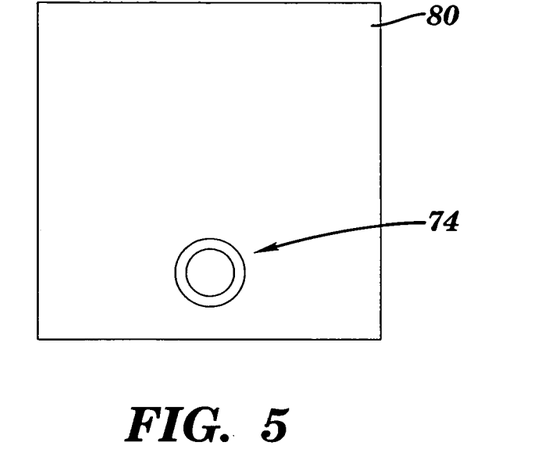
FIG. 5 is a top view of a flange for the aeration assembly for the feeder system shown in FIGS. 1 and 2.

Referring to FIGS. 1, 2 and 5, the aeration assembly 14 includes a bottom plate 80 with an aperture 74 which is connected to the variable-are flow-meter 68 by a pipe 84, although other types of connections to other types of fluid supply systems can be used. The variable-are flow-meter 68 is connected in series with the manual control valve 66, the solenoid operated valve 67, and the fluid source 70. The manual control valve 66 and the solenoid operated valve 67 can be used separately or together to control the flow of air or other fluid from the fluid source 70. Although a manual control valve 66 and a solenoid operated valve 67 are disclosed, the aeration assembly 14 may have other numbers and types of valves or other elements connected in other configurations. The fluid source 70 can be a fan or other device to draw in air, although other types of fluid sources, such as a tank filled with a fluid to be used for aeration can be used.

The aeration control system 72 is coupled to the solenoid operated valve 67 and the variable-area flow-meter 68, and the fluid source 70, although the aeration control system 72 can be coupled to other types and numbers of elements. The aeration control system 72 comprises a processor and a memory with programmed instructions for controlling the operation of the solenoid operated valve 67 and/or the fluid source 70 in response to readings from the variable-area flow-meter 68 about the rate of flow of air or other fluid, although other manners for controlling the operation of the solenoid operated valve 67 and/or using the readings from the variable-area flow-meter 68 can be used, such as with commands from the feeder control system 86 can be used. By way of example, if the readings from the variable-area flow-meter 68 indicate that the rate of flow of the air for aeration is too slow or to fast too fluidize the fine particle solids, then the aeration control system 72 might signal the fluid source 70 to increase or decrease the rate at which fluid is supplied.

Referring to FIGS. 1 and 2, the feeder control system 86 is configured to accomplish proportional control of opening and closing the inlet 18 in seat 16 with the seat plate 22 and of the aeration assembly 14, although the feeder control system 86 can be configured to carry out other operations. The feeder control system 86 includes a central processing unit (CPU) or processor 88, a memory 90, an input/output (I/O) interface system 92, a user input device 94, and a display 96 which are coupled together by a bus system or other link 98, although the feeder control system 86 may comprise other numbers and types of elements in other configurations and other types of control systems may be used for the feeder control system 86, such as an application specific integrated circuit designed to control fluid flow and the feed of the fine particle solids. In the feeder control system 86, the CPU 88 executes a program of stored instructions for one or more aspects of a method for controlling fluid flow and a rate of feeding fine particle solids in accordance with embodiments of the present invention as described herein. These programmed instructions are stored in the memory 90, although some or all could be stored and retrieved from other locations. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the CPU, can be used for memory 90.

The input/output interface system 92 is used to operatively couple and communicate between other components, including the aeration control system 72 and the actuator control system 100. In this particular embodiment, the connection is shown as a hard wired connection, although a variety of different types of connections and communication techniques can be used to transmit signals from the feeder control system 86 to and from other components, including the aeration control system 72 and the actuator control system 100, including wireless communications.

The user input device 94 enables an operator to generate and transmit signals or commands to the CPU. A variety of different types of user input devices, such as a keyboard or computer mouse, can be used. The display 96, such as a cathode ray tube, is used to provide an output to the operator on the operation of the feeder system 10, although other types of displays can be used.

Figure 6:
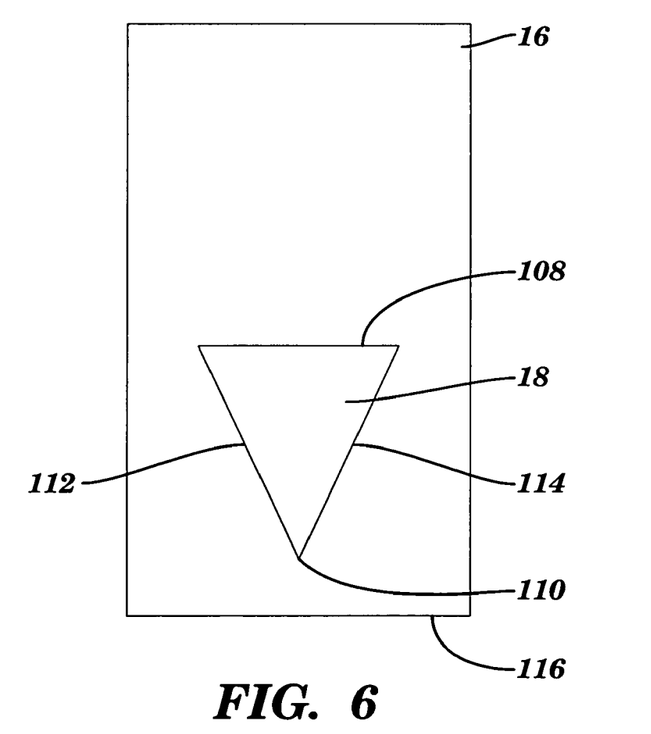
FIG. 6 is a side view of a seat with an inlet for the feeder system shown in FIGS. 1 and 2.

Referring to FIGS. 1, 2, and 6, the seat assembly 48 and a backseat assembly 102 have several functions including providing uniform, consistent controlled flow of fine particle solids. The rate of flow is controlled by the seat assembly 48 and the backseat assembly 102 to be at least somewhat proportional to a position of the actuator 32. Actual linearity is not necessary, only a characteristic that is close enough to linear that programmed control instructions stored in the memory of the feeder control system 86 can be tuned to provide acceptably precise control of the flow of fine particle solids. The seat assembly 48 and the backseat assembly 102 also provide tight shutoff when no flow is desired. This shutoff may or may not be gas tight, but must stop substantially all solids flow. Additionally, the seat assembly 48 and the backseat assembly 102 provide high wear resistance due to erosion from the fine particle solids being fed by a combination of the mechanical design of the parts as described herein and the selection, when needed, of wear resistant materials. Further, the seat assembly 48 and the backseat assembly 102 are designed to wear in a manner that does not compromise flow control and tight shutoff as parts are worn by the solids being fed. Further, the seat assembly 48 and the backseat assembly 102 accomplish the above described functions economically.

Referring to FIGS. 1, 2, and 6-10, the seat assembly 48 comprises the seat 16, seat plate 22, and seat plate carrier 104 and the backseat assembly 102 comprises the backseat 20, backseat plate 42, and backseat plate carrier 106, although the seat assembly 48 and the backseat assembly 102 each can comprise other numbers and types of elements in the other configurations. In these embodiments, the seat 16, seat plate 22, backseat 20 and backseat plate 22 are the only wear parts in the feeder system 10 and are designed to be easily replaced. The seat 16 and backseat 20 fit into the seat-and-backseat housing 36 in the feeder housing 12. The seat plate 22 and backseat plate 22 are spaced apart and between the seat 16 and backseat 20 for movement along the seat 16 and backseat 20, respectively, to any position from covering to exposing the inlet 18 in the seat 16. The spring 26, as described in greater detail below, biases the seat plate 22 against the seat 16 and the backseat plate 22 against the backseat 20.

The seat 16 is about a ½" thick, flat rectangular part with smooth front and back faces and a cutout for the inlet 18 through which the fine particle solids flow, although the seat 16 can have other dimensions and shapes with other numbers of openings. The seat 16 is made of mild steel, although the seat 16 can be made from other materials, such as hardened steel, abrasion resistant steel or ceramic material, either formed separately or integrated with a metal backing plate, as required for erosion control. Whichever material is selected for the seat 16, in these embodiments the same material is used for the seat 16, seat plate 22, backseat 20 and backseat plate 22, although different materials could be used. By way of example, the seat 16 fabricated from common mild steel plate exhibits excellent wear characteristics and provides good shutoff and acceptable sliding friction without any machining.

The inlet 18 in the seat 16 through which the fine particle solids flow is in the form of an isosceles triangle with the unequal length side 108 positioned horizontally at the top and the apex 110 of the two equal length sides 112 and 114 pointed downward, although the inlet 18 could have other shapes. The apex 110 of the inlet 18 is positioned a substantial distance from the bottom edge 116 of the seat 16, by way of example only, one inch. The area of the inlet 18 is determined based on the desired flow rate of the fine particle solids. The height of the inlet 18 is a trade-off between increasing linearity of response, more height, and limiting the required stroke of the actuator 32, less height. The inlet 18 can be any convenient width, but must be centered horizontally on the seat 16 and must fit within reasonable dimensions for the feeder housing 12 with its edges being a substantial distance from the sides of the seat 16, by way of example only, 1¼". For proper feeding of fine particle solids, the height and width selection will result in the angle between the equal length sides 112 and 114 being between about 40° and 60°, although the dimensions can vary.

When the seat 16 is installed, the seat 16 is secured against the plate 44 which is part of the inlet structure housing 34 and also forms a wall of the seat and backseat housing 36 in the feeder housing 12 and which separates the seat assembly 48 from compartment 76. This plate 44 has an opening 42 which is slightly larger than, of the same general shape as, and in the same general location as the inlet 18 in the seat 16.

The seat plate 22 is a ½" thick, flat rectangular part with smooth front and back faces and is formed from the same material as the seat 16, although the seat plate 22 could have other dimensions and shapes and could be made from other materials. The seat plate 22 has no cutouts or other openings and when the seat plate 22 is in the closed position as shown in FIG. 1 is sufficiently large to cover the inlet 18 in the seat 16 and to extend to the bottom edge 116 of the seat 16. By way of example, the seat plate 22 will extend at least 0.75 inches past the apex 110 of the inlet 18 to form a tight seal which is wear resistant. The width of the seat plate 22 provides sufficient clearance from the sides of the seat and backseat housing 36 so the seat plate 22 can slide up and down on the seat 16 without interference from the sides of the seat-and-backseat housing 36. The seat plate 22 is pressed tightly against the seat 16 by the spring 26, but is moveable with respect to the seat 16 to be able to control the rate of flow through the inlet 18 in the seat 16. An optional air actuated shutoff valve (not shown) may be installed upstream of the feeder inlet 40 to close the feeder inlet 40 to assure flow stoppage in the event of a power failure.

The backseat 20 is a ½" thick, flat rectangular part with smooth front and back faces and is formed from the same material as the seat 16, although the backseat 20 could have other dimensions and shapes and could be made from other materials. The backseat 20 is identical to the seat 16 shown in FIG. 6, except the backseat 20 does not have a cutout. In other embodiments, the backseat 20 could be identical to the seat 16 including the inlet 18, so that the backseat 20 could be considered an "installed spare" for the seat 16.

The backseat 20 plate is a ½" thick, flat rectangular part with smooth front and back faces and is formed from the same material as the seat 16, although the backseat plate 22 could have other dimensions and shapes and could be made from other materials. The backseat plate 22 has overall dimensions which are identical to the seat plate 22 and may also be considered an "installed spare" for the seat plate 22.

The function of the backseat 20 and backseat plate 22 combination is to provide more-or-less equal reaction forces, both normal to the backseat plate 22 due to loading from the spring 26 and parallel with the backseat plate 22 due to sliding friction as the seat plate 22 and backseat plate 22 are moved. This effectively decouples any moments generated by actuator forces from the uniform loading of the seat 16 and seat plate 22, and, incidentally, of the backseat 20 and backseat plate 22, by the spring 26.

Figure 7:
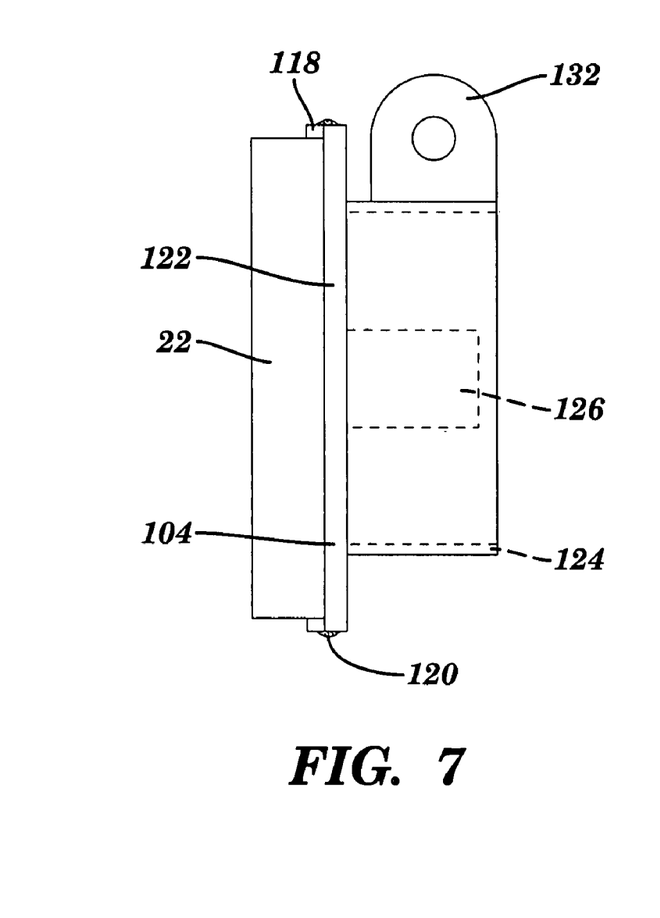
FIG. 7 is a side view of a biasing housing and a seat plate carrier for the feeder system shown in FIGS. 1 and 2.
Figure 8:
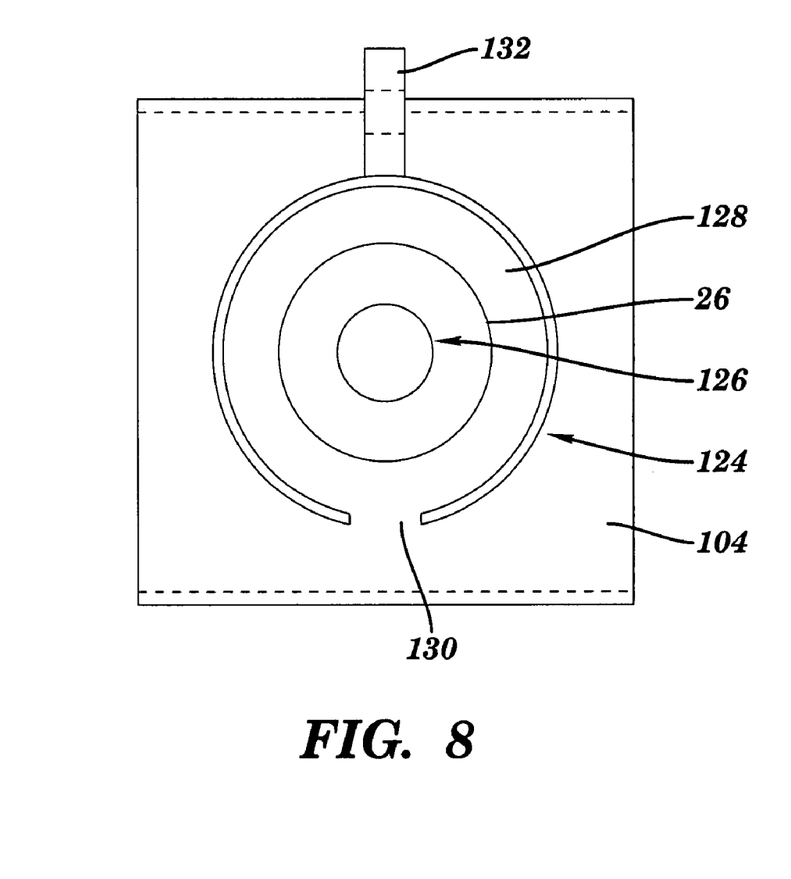
FIG. 8 is an end view of the biasing housing for the feeder system shown in FIG. 7.

The seat plate carrier 104 comprises a plate 122, a pipe section 124, and a rod section 126 which are all made from mild steel, although the seat plate carrier 104 can comprise other numbers and types of elements in other configurations which are made from other materials. The seat plate carrier 104 has lips 118 and 120 at the top and bottom to detachably secure the seat plate 22 and to assure the seat plate 22 moves precisely in the up and down directions with the seat plate carrier 104. The pipe section 124 forms half of the spring cavity 128 and the spring 26 is seated around the rod section 126 which serves to assure the spring 26 stays centered. Since the fine particle solids will enter the pipe section 124, the bottom has a slot 130 to allow the fine particle solids to drain. The plate eye 132 on top of the pipe section 124 forms the connection point to the actuator rod 28.

The seat plate carrier 104 fixes and moves the seat plate 22 up and down in response to the movement of the actuator rod 28 and actuator lever 30 by the actuator 32. Simultaneously, the seat plate carrier 104 provides equal distribution of the loading from the spring 26 that forces the seat plate 22 against the seat 16. The seat 16 which is detachably retained by the lips 118 and 120 of the seat plate carrier 104 can be replaced while allowing reuse of the seat plate carrier 104. Additionally, with the seat plate carrier 104 very hard and wear resistant, but more brittle materials, such as ceramics, can be used for the seat 16.

Figures 9, 11:
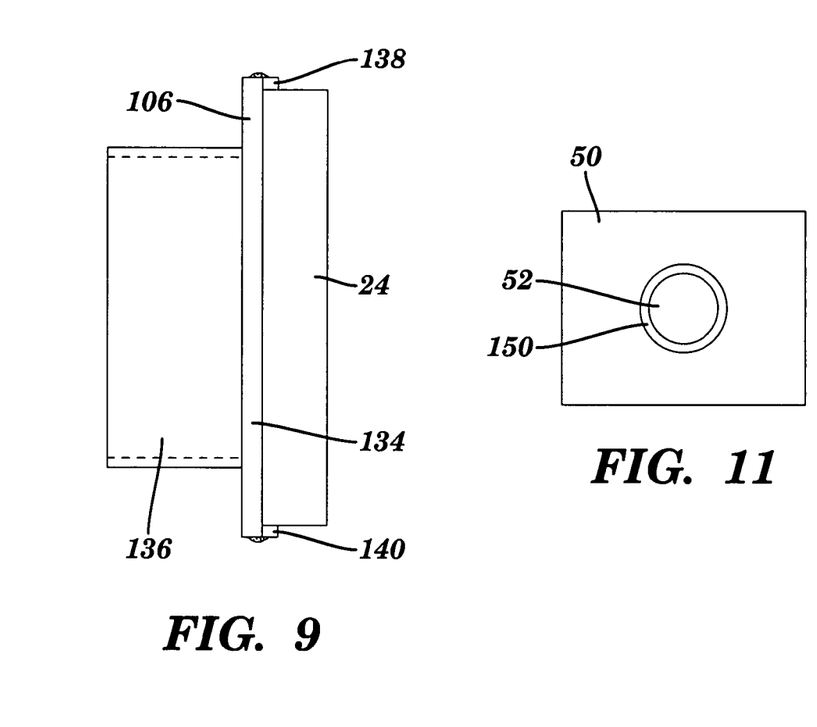
FIG. 9 is a side view of a biasing housing and a backseat plate carrier for the feeder system shown in FIGS. 1 and 2.
FIG. 11 is a top view of a plate for the seat and backseat assembly for the feeder system shown in FIGS. 1 and 2.
Figure 10:
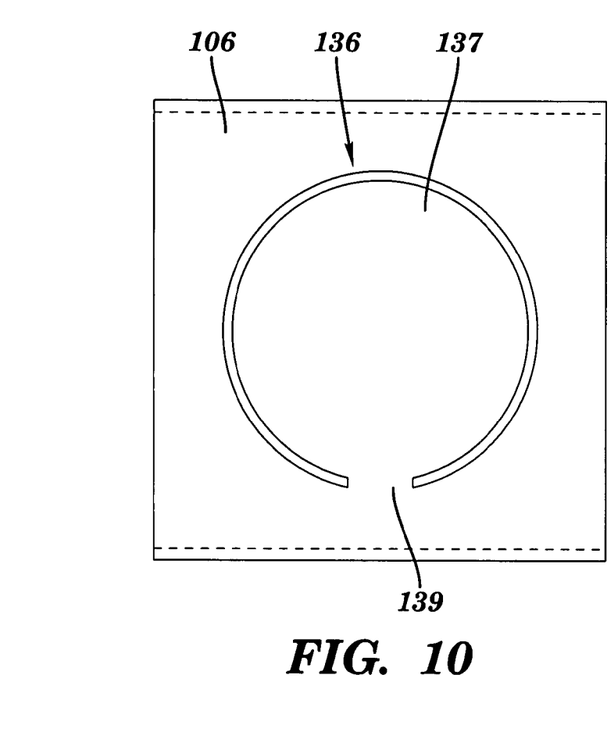
FIG. 10 is an end view of the biasing housing shown in FIG. 9.

The backseat plate carrier 106 comprises a plate 134 and a pipe section 136 which are all made from steel, although the backseat plate carrier 106 can comprise other numbers and types of elements in other configurations which are made from other materials. The pipe section 136 defines a cavity 137 and has a slot 139 which substantially aligns with the slot 130 to allow the fine particle solids to drain. The backseat plate carrier 106 has lips 138 and 140 at the top and bottom to detachably secure the backseat plate 24 and to assure the backseat plate 24 moves precisely in the up and down directions with the backseat plate carrier 106. The pipe section 136 of the backseat plate carrier 106 has an outer diameter which is slightly smaller than the inner diameter of the pipe section 124 of the seat plate carrier 104 so that the pipe sections 124 and 134 can be joined to form a coaxial slip joint. The backseat plate carrier 106 has the same function as the seat plate carrier 104.

The spring 26 is a compression type spring which is seated around the rod 126 and within the pipe sections 124 and 136 in the merged cavities 128 and 137, although other types of biasing devices which are mounted in other manners can be used. The spring 26 is selected to provide a significant preload force between the seat 16 and seat plate 22 and the backseat 20 and backseat plate 22, although other types of biasing devices can be used. The spring constant for the spring 26 is chosen so that this preload force will stay above a selected value, even if the thickness of the wear parts decreases due to long term wear. The minimum preload is critical because the spring 26 provides the clamping force to assure tight shutoff and the spring 26 assures that little, if any, fine particle solids become trapped between the seat 16 and seat plate 22. By way of example only, the minimum preload for the spring 26 may be about 1000 lbs. Therefore, any wear on the large surfaces of the seat 16 and seat plate 22 is primarily from sliding friction between the seat 16 and seat plate 22 and not erosive action from the fine particle solids.

Referring to FIGS. 1, 2, and 11-13, a seal assembly 142 prevents leakage of the fine particle solids from the feeder system 10. The seal assembly 142 comprises a tubular seal membrane 144 and clamps 146 and 148 to secure the seal membrane 144 although other types of seals could be used. The seal assembly 142 is clamped at one end to a short pipe section 150 protruding from the aperture of the plate 50 for the seat-and-backseat housing 36 shown in FIGS. 1, 2, and 11 and at the other end to an actuator rod end cap 152. The actuator rod 28 is seated in an aperture 154 and is secured to the actuator rod end cap 152 by threads, although other manners for connecting the plug 152 can be used. The axis of the tubular seal membrane 144 is substantially vertical so that the fine particle solids can drain out from the tubular seal membrane 144 to the outlet 46, although the tubular seal membrane 144 could have other orientations. The seal membrane 144 is constrained by a wire spiral or mesh that allows large axial movement without significant radial swelling or collapsing in the compressed condition. By way of example only, the seal membrane 144 is capable of 6" axial movement. The seal membrane 144 is designed to withstand the maximum hydrostatic pressure possible assuming a full column of fine particle solids, i.e.—the pressure imposed by a full hopper of fully aerated fine particle solids, with a suitable safety margin. To make the seal membrane 144 economical, a short piece of wire wound fabric hose with a plastic impermeable surface suitable for the feeder operating temperature can be used for the seal membrane 144, although other types of materials can be used.

Referring to FIGS. 1, 2, and 12-14, the actuator assembly 160 comprises the actuator rod 28, the actuator lever 30, the actuator 32, and an actuator control system 100, although other types and numbers of elements in other configurations and other types of actuating systems can be used. The actuator rod 28 includes a clevis arrangement 162 and 164 at each end of the actuator rod 28, and the actuator rod end cap 152, although the actuator assembly 160 can comprise other types and numbers of elements. The actuator rod 28 is threaded a substantial portion of its length to make assembly and length adjustment easy and economical. One clevis arrangement 162 at one end of the actuator rod 28 connects to the plate eye 132 on top of the seat plate carrier 104 and the other clevis arrangement 164 at the other end of the actuator rod 28 is connected to the actuator lever 30. The actuator rod end cap 152 is secured to the actuator rod 28 adjacent one end and the seal membrane 144 is clamped around the outer surface of the actuator rod end cap 152 to form a tight seal.

Figure 14:
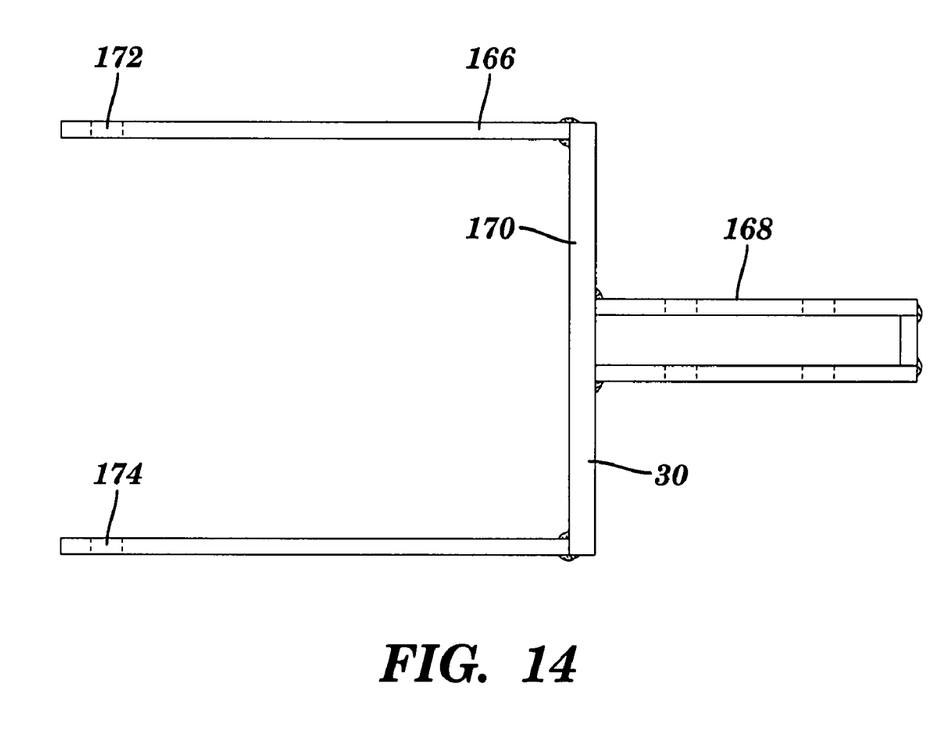
FIG. 14 is a top view of an actuator lever for the feeder system shown in FIGS. 1 and 2.

The actuator lever 30 comprises a U-shaped section 166 with an elongated section 168 extending from the base 170 of the U-shaped section 166, although the actuator lever 30 could have other shapes and configurations. Each of the ends 172 and 174 of the U-shaped section 166 of the actuator lever 30 are pivotally connected to flanges 176 on opposing sides of the outer surface of the inlet housing 34, although the actuator lever 30 can be connected in other manners. The elongated section 168 of the actuator lever 30 is pivotally connected to the clevis arrangement 164 at one end of the actuator rod 28 and is also pivotally connected to one end of the actuator 32. The actuator lever 30 is fabricated from mild steel, although other types of materials can be used. One of the functions of the actuator lever 30 is to constrain the movement of the top of the actuator rod 28 to a specified arc that can be tolerated by the seal assembly 142. Placing the hinge or pivot point of the actuator lever 30 on the opposite side of the feeder housing 12 from the actuator rod 28 provides a favorable arrangement, although the hinge points could be at other locations.

Since the feeder system 10 requires a fairly long actuation stroke, keeping the distance between the hinge or pivot points and the actuator rod 28, effectively the swing radius, as long as possible minimizes the horizontal displacement the seal assembly 142 must tolerate over the stroke of the actuator rod 28. This arrangement requires the actuator lever 30 to be split where it passes around the feeder housing 12, although other arrangements are possible, such as a single side arm which could handle the unbalanced actuation loads. As a result, the U-shaped section 166 of the actuator lever 30 is required in these embodiments, although other configurations for the actuator lever 30 could be used depending on the application requirements. With the U-shaped section 166, the present invention provides an actuator lever 30 that is economical to fabricate and which can easily handle the actuation loads.

Figure 12:
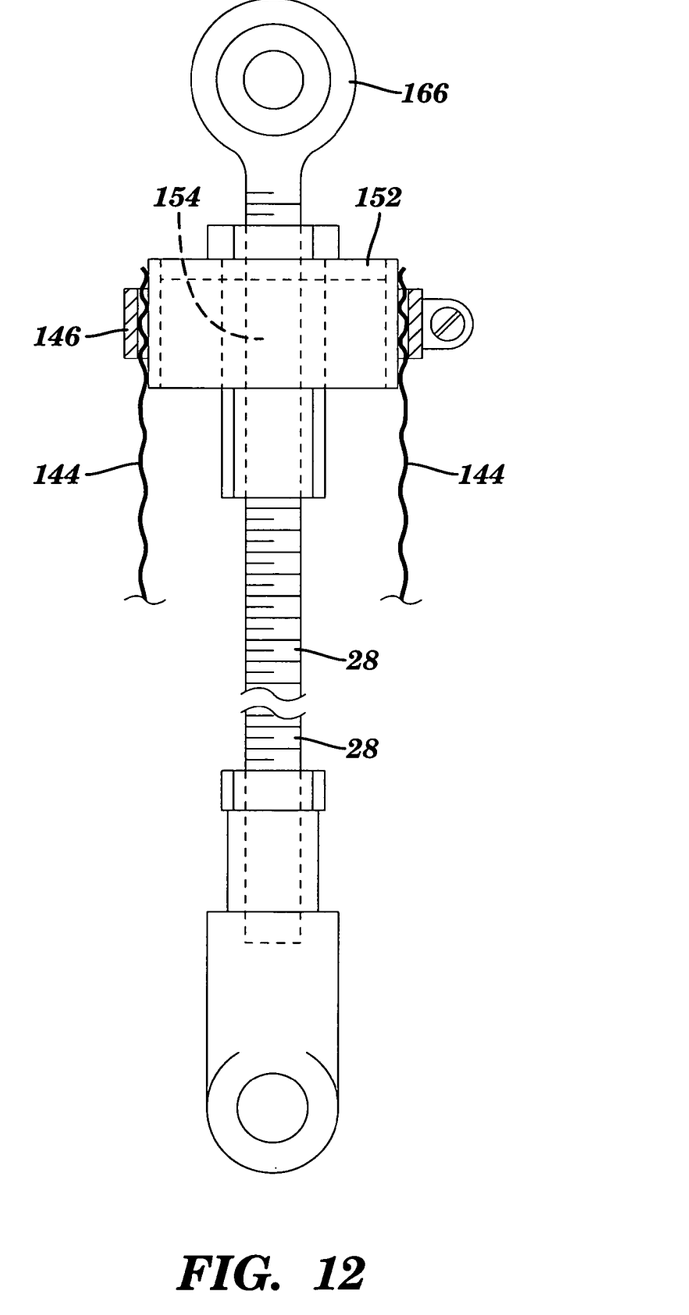
FIG. 12 is a front view of an actuator assembly for the feeder system shown in FIGS. 1 and 2.
Figure 13:
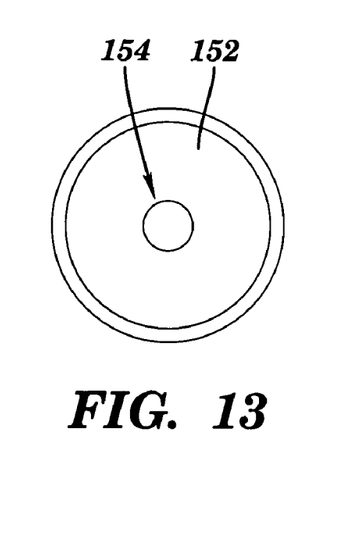
FIG. 13 is a top view of an actuator rod end cap 152 for the actuator assembly shown in FIG. 12.

The actuator rod 28 connects at one end to the actuator lever 30 through the clevis arrangement 164 close to the actuator 32 attachment point. This attachment point can be adjusted to optimize the actuating force vs. actuating stroke requirement, i.e. moving the attachment point further out on the actuator lever 30 requires more of an actuating stroke, but the increased mechanical advantage reduces the actuating force required.

The actuator 32 is a linear actuator having suitable stroke, force, travel speed and positioning characteristics, although other types and numbers of driving systems for moving the seat plate 22 and back seat 24 could be used, such as two actuators. Although a linear actuator is shown, other types of actuators, such a heavy duty, floor mounted electric rotary actuator with a connecting rod to convert the rotary motion to linear motion or other types of hydraulic or pneumatic actuators could be used.

The actuator assembly 160 needs to provide a sufficient actuating force, a sufficient actuating stroke, an acceptable travel speed, and proper positioning. The actuating force must overcome the sliding friction between the spring loaded seat 16 and seat plate 22 and between the spring loaded backseat 20 and backseat plate 22, as well as other minor mechanical friction points in the actuator assembly 160. By way of example only, in these embodiments the actuator 32 is capable of five hundred lbs. force in either direction, although other amounts of force may be required. The length of the actuating stroke is set by the height of inlet 18 in the seat 16 and by the height and bottom overlap of the seat plate 22. By way of example only, in these embodiments a 6" stroke was required to clear the inlet 18 in the seat 16, although other lengths can be required.

The feeder system 10 must be able to change flow rates as quickly as the process requires. However, the limited feeding force, head pressure of aerated solids, and high material inertia, compared to gases or liquids, limits the possible rate of change of flow rate. Therefore, the speed of the actuator 32 does not need to be unusually high. By way of example only, in these embodiments a full stroke travel time of about forty seconds is adequate. The actuator 32 includes an actuator control system 100 or positioner which can bring the actuator 32 and thus the seat plate 22 to a specified position for a given control input from the feeder control system 86, although the actuator 32 can be controlled in other manners.

The operation of the feeder system 10 for fine particle solids in accordance with embodiments of the present invention will now be described with reference to FIGS. 1-3, 6, 7-10, 12, and 14. If the feeder system 10 is not already installed, the feeder housing 12 can be directly bolted in to replace an existing prior art feeder and its inlet pipe. The feeder inlet 40 and feeder outlet 56 for the feeder system 10 are configured to be substantially collinear so that this type of replacement of the feeder system 10 can be easily and quickly accomplished.

Once the feeder system 10 is in place fine particle solids are added to the feeder system 10 via the round-to-square inlet transition device which is connected to the feeder inlet 40 of the inlet housing 34 for the feeder housing 12. In the embodiments described herein, the feeder system 10 is used with fine particle solids, such as fly ash. The fine particle solids which are introduced are gravity fed towards the aeration assembly 14, although other manners for feeding the fine particle solids can be used.

Meanwhile, the fluid source 70 in the aeration assembly 14 is engaged by the feeder control system 86 to begin to draw in air, although the fluid source 70 could be engaged in other manners, such as with the actuator control system 100 or by a manual control. If the manual control valve 66 is closed, the manual control valve 66 is opened by the operator to the desired amount. The manual control valve 66 can be adjusted during operations by the operator to provide manual control. Additionally, the solenoid operated valve 67 is energized in response to a signal from the feeder control system 86 which opens the solenoid operated valve 67, although the solenoid operated valve 67 could be controlled in other manners, such as with the actuator control system 100. The variable-area flow-meter 68 monitors the rate of flow of the fluid and transmits flow readings to the feeder control system 86 which processes the flow readings to control the rate of fluid supplied by the fluid source 70, although the readings from the variable-area-flow meter could be processed in other manners and the supply of fluid from the fluid source 70 can be controlled in other manners.

The fluid is supplied by the pipe 84 through the aperture 74 into the compartment 78 below the aeration membrane 64. The aeration membrane 64 is permeable so that the fluid, in this example air, passes through to the other compartment 76 to fluidize the fine particle solids. The pressure drop of the aeration air or other fluid across the aeration membrane 64 helps to provide uniform, small bubble flow of aeration air at all locations across the aeration membrane 64. When the aeration air or other fluid is off, the aeration membrane 64 keeps the fine particle solids from flowing into the compartment 78 and aperture 74.

For proper operation of the feeder system 10 a reasonably consistent density of the fine particle solid feed is desired. To help to achieve this reasonably consistent density, the aeration membrane 64 is arranged as close as practicable to the inlet 18 in the seat 16. Additionally, the aeration membrane 64 is positioned so that most heavy foreign material, for example large chunks of the feed material as well as nuts and bolts, entering with the fine particle solids passes through the feeder system 10 rather than sinking through the aerated fine particle solids and becoming trapped in the feeder system 10.

Initially, the seat plate 22 is in a position which covers the inlet 18 in the seat 16 and is sufficiently large to extend past the bottom of the inlet 18 to the bottom of the seat 16 as shown in FIG. 1. This overlap of the seat plate 22 well past the bottom of the inlet 18 aids in tight shutoff when no flow is desired and helps with wear resistance. The seat plate 22 is pressed tightly against the seat 16 by the spring 26 to provide positive, tight shutoff when flow is not desired, but is moveable with respect to the seat 16 to be able to control the rate of flow through the inlet 18. Like the seat plate 22, the backseat plate 24 is pressed tightly against the backseat 20 by the spring 26, but is moveable with respect to the backseat 20. The spring 26 provides the necessary force to assure tight shutoff of the inlet 18 so that little, if any, fine particle solids become trapped between the seat 16 and seat plate 22.

When the actuator control system 100 is activated by a signal from the feeder control system 86, the actuator 32 begins to extend which moves the actuator lever 30 in a generally upward arc. As the actuator lever 30 is pivoted in this generally upward arc, the actuator rod 28 is drawn up which pulls the seat plate carrier 104 and the backseat plate carrier 106 in an upward direction within the seat-and-backseat housing 36. The upward movement of the seat plate carrier 104 and the backseat plate carrier 106 causes the seat plate 22 and the backseat plate 24 to move upward with respect to the seat 16 and backseat 20, respectively, and eventually begins to expose the inlet 18 in the seat 16. When the actuator 32 is fully extended, then the seat plate 22 and backseat plate 22 have been moved far enough to fully expose the inlet 18 as shown in FIG. 2. The actuator 32 can be controlled to move the seat plate 22 with respect to the seat 16 to open the inlet 18 varying amounts to provide control over the feed rate. The process described above is simply reversed to begin to close the inlet 18 in the seat 16 to reduce the flow rate or to completely close the inlet 18 as shown in FIG. 1.

When flow of the fine particle solids is desired, the seat plate 22 is raised as described above and the lower apex 110 of the inlet 18 in the seat 16 is first uncovered. Although aerated fine particle solids do not have "surface tension" as a liquid might, they tend to flow poorly through restricted openings. Therefore, a significant initial opening is required to initiate flow. This eliminates the problem of excessive local wear when solids flow for long periods through a very small opening. Nonetheless, the feeder system 10 can stably feed relatively low amounts of the fine particle solids even with a larger than expected portion of the inlet 18 uncovered. As more flow is desired, the seat plate 22 is raised further as described above. The average velocity through the inlet 18 tends to drop off as the uncovered area of the cutout increases. This is the factor that gives the feeder system 10 a more linear characteristic than might be expected since each increment of travel of the seat plate 22 uncovers a more than linearly increasing area of the inlet 18. The fine particle solids which pass through the inlet 18 continue out through the outlet 46 between the seat 16 and the backseat 20 to the outlet housing 38.

Accordingly, the present invention provides a controlled rate feeder system 10 which can feed fine particle solids into various process units at variable and consistently well controlled rates and can do so at a reasonable cost. Additionally, the present invention provides positive flow cutoff when no flow is desired (i.e.—not subject to flooding or similar problems) and is not subject to leakage through shaft seals or other actuation interfaces. The present invention does not requiring a tall, "mass flow" or other expensive hopper design. Further, the present invention has excellent wear characteristics, i.e. either exhibiting very little wear, having flow characteristics that are unaffected by significant wear or both.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed:

1. A feeder system comprising:
    a plate assembly housing with an inlet and an outlet which are connected together by at least one passage;
    a seat plate assembly moveable to any position between covering and exposing the inlet, wherein a surface of the seat plate assembly which is adjacent to the inlet in the plate assembly housing is substantially smooth;
    a backseat plate assembly positioned adjacent to and moveable with the seat plate;
    at least one biasing device positioned between the seat plate assembly and the backseat plate assembly which biases the seat plate assembly and the backseat assembly apart and biases the seat plate assembly against an inner surface of the plate assembly housing and the backseat plate assembly against another inner surface of the plate assembly housing, wherein the plate assembly housing further comprises a seat with the inlet and a backseat positioned adjacent to and spaced from the seat, the biasing device biases the seat plate assembly against the seat and the backseat plate assembly against the backseat;
    wherein at least one position of the seat plate assembly exposes a portion of an opening covered by the seat plate assembly to the inlet to provide passage directly past the seat plate assembly into the opening while the at least one biasing device biases the seat plate assembly against an inner surface of the plate assembly housing to cover a remaining portion of the opening;
    wherein the outlet is located between the seat plate assembly and the backseat plate assembly; and
    an actuator assembly that moves the seat plate assembly to any position between covering and exposing the inlet.

2. The system as set forth in claim 1 wherein the inlet has a tapered shape, wherein a narrowest region of the inlet is adjacent one end of the inlet and is exposed first when the actuator assembly moves the seat plate assembly with respect to the opening towards the position exposing the inlet in the seat and a widest region of the inlet is adjacent another end of the inlet.

3. The system as set forth in claim 2 wherein the inlet has the shape of an isosceles triangle.

4. The system as set forth in claim 1 wherein the seat plate assembly comprises a seat plate seated in a seat plate carrier and the backseat plate assembly comprises a backseat plate seated in a backseat plate carrier, wherein the at least one biasing device is positioned in and between the seat plate carrier and the backseat plate carrier and biases the seat plate against the inner surface of the plate assembly housing in the at least one passage and the backseat plate against the another inner surface of the plate assembly housing in the at least one passage.

5. The system as set forth in claim 4 wherein the seat plate carrier and the backseat plate carrier define a housing for the biasing device which substantially encloses the biasing device.

6. The system as set forth in claim 5 wherein the housing for the biasing device includes at least one drain hole.

7. The system as set forth in claim 1 wherein the at least one biasing device comprises a compression spring.

8. The system as set forth in claim 1 wherein the actuator assembly further comprises:
    an actuator rod pivotally connected to the biasing device;
    an actuator lever pivotally connected to the actuator rod; and
    an actuator pivotally connected to the actuator lever to drive the actuator rod to move the seat plate assembly between the position covering the inlet and the position exposing the inlet.

9. The system as set forth in claim 1 further comprising at least one seal assembly which seals at least a portion of the at least one passage in the plate assembly housing through which a portion of the actuator assembly extends.

10. The system as set forth in claim 9 wherein the at least one seal assembly comprises an extendable and compressible seal membrane which is secured around a portion of the actuator assembly.

11. The system as set forth in claim 1 further comprising a feeder housing with an inlet passage coupled to an outlet passage, wherein the inlet passage is connected to the inlet in the plate assembly housing and the outlet passage is connected to the outlet in the plate assembly housing.

12. The system as set forth in claim 11 wherein an opening to the inlet passage and an opening to the outlet passage of the feeder housing are substantially co-linear.

13. The system as set forth in claim 11 further comprising an aeration assembly in the inlet passage of the feeder housing.

14. The system as set forth in claim 13 wherein the aeration assembly comprises:
    an aeration membrane positioned across at least a portion of the inlet passage;
    an aeration passage connected to the feeder housing to direct aeration towards the aeration membrane; and
    a fluid source coupled to the aeration passage.

15. The system as set forth in claim 13 further comprising a feeder control system which controls the operation of at least one of the actuator assembly and the aeration assembly.

16. The system as set forth in claim 1 wherein the inner surface of the plate assembly housing adjacent the inlet is substantially smooth.

17. The system as set forth in claim 1 wherein another inner surface of the plate assembly housing adjacent the backseat plate assembly is substantially solid.

18. The system as set forth in claim 1 wherein in every position between covering and exposing the inlet the seat plate assembly substantially rests against the seat and the backseat plate assembly substantially rests against the backseat.

19. The system as set forth in claim 1 wherein the at least one biasing device consists of a single biasing device positioned between the seat plate assembly and the backseat plate assembly which biases the seat plate assembly and the backseat assembly apart and biases the seat plate assembly against an inner surface of the plate assembly housing and the backseat plate assembly against another inner surface of the plate assembly housing.

20. A method for making a feeder system, the method comprising:
providing a plate assembly housing with an inlet and an outlet which are connected together by at least one passage, the providing a plate assembly housing further comprising providing the inlet in a seat and positioning a backseat adjacent to and spaced from the seat;
positioning a seat plate assembly in the plate assembly housing to be moveable to any position between covering and exposing the inlet, wherein a surface of the seat plate assembly which is adjacent to the inlet in the plate assembly housing is substantially smooth;
positioning a backseat plate assembly in the plate assembly housing adjacent to and moveable with the seat plate;
biasing the seat plate assembly and the backseat assembly apart with a biasing device that biases the seat plate assembly against an inner surface of the plate assembly housing and the backseat plate assembly against another inner surface of the plate assembly housing;
wherein at least one position of the seat plate assembly exposes a portion of an opening covered by the seat plate assembly to the inlet to provide passage directly past the seat plate assembly into the opening while the at least one biasing device biases the seat plate assembly against an inner surface of the plate assembly housing to cover a remaining portion of the opening;
wherein the outlet is located between the seat plate assembly and the backseat plate assembly; and
providing an actuator assembly that moves the seat plate assembly between the position covering the inlet and the position exposing the inlet.

21. The method as set forth in claim 20 wherein the forming the inlet in the seat further comprises forming an inlet which has a tapered shape, wherein a narrowest region of the inlet is adjacent one end of the inlet in the seat and is exposed first when the actuator assembly moves the seat plate assembly with respect to the opening towards the position exposing the inlet and a widest region of the inlet is adjacent another end of the inlet.

22. The method as set forth in claim 21 wherein the inlet has the shape of an isosceles triangle.

23. The method as set forth in claim 20 wherein the positioning the seat plate assembly further comprises securing a seat plate in a seat plate carrier, wherein the positioning the backseat plate assembly further comprises securing a backseat plate seated in a backseat plate carrier, wherein the biasing the seat plate assembly and the backseat assembly apart further comprises positioning at least one biasing device in and between the seat plate carrier and the backseat plate carrier and biasing the seat plate against the inner surface of the plate assembly housing in the at least one passage and the backseat plate against the another inner surface of the plate assembly housing in the at least one passage.

24. The method as set forth in claim 23 further comprising defining a housing for the biasing device with the seat plate carrier and the backseat plate carrier which substantially encloses the biasing device.

25. The method as set forth in claim 24 further comprising providing for at least one drain hole in the housing for the biasing device.

26. The method as set forth in claim 20 wherein the at least one biasing device comprises a compression spring.

27. The method as set forth in claim 20 wherein providing the actuator assembly further comprises:
pivotally connecting an actuator rod to the biasing device;
pivotally connecting an actuator lever to the actuator rod; and
pivotally connecting an actuator to the actuator lever to drive the actuator rod to move the seat plate assembly between the position covering the inlet and the position exposing the inlet.

28. The method as set forth in claim 20 further comprising sealing at least a portion of the at least one passage in the plate assembly housing through which a portion of the actuator assembly extends through with a seal assembly.

29. The method as set forth in claim 28 wherein the at least one seal assembly comprises an extendable and compressible seal membrane which is secured around a portion of the actuator assembly.

30. The method as set forth in claim 20 further comprising providing a feeder housing with an inlet passage coupled to an outlet passage, wherein the inlet passage is connected to the inlet in the plate assembly housing and the outlet passage is connected to the outlet in the plate assembly housing.

31. The method as set forth in claim 30 wherein an opening to the inlet passage and an opening to the outlet passage of the feeder housing are substantially co-linear.

32. The method as set forth in claim 30 further comprising providing an aeration assembly in the inlet passage of the feeder housing.

33. The method as set forth in claim 32 wherein the providing an aeration assembly comprises:
placing an aeration membrane across at least a portion of the inlet passage;
connecting an aeration passage to the feeder housing to direct aeration towards the aeration membrane; and
coupling a fluid source to the aeration passage.

34. The method as set forth in claim 32 further controlling the operation of at least one of the actuator assembly and the aeration assembly with a feeder control system.

35. The method as set forth in claim 20 wherein the inner surface of the plate assembly housing adjacent the inlet is substantially smooth.

36. The method as set forth in claim 20 wherein another inner surface of the plate assembly housing adjacent the backseat plate assembly is substantially solid.

37. The method as set forth in claim 20 wherein the biasing the seat plate assembly and the backseat assembly apart further comprises biasing a seat plate against the seat and a backseat plate against the backseat and in every position between covering and exposing the inlet the seat plate assembly substantially rests against the seat and the backseat plate assembly substantially rests against the backseat.

38. The method as set forth in claim 20 wherein the at least one biasing device consists of a single biasing device positioned between the seat plate assembly and the backseat plate assembly which biases the seat plate assembly and the backseat assembly apart and biases the seat plate assembly against an inner surface of the plate assembly housing and the backseat plate assembly against another inner surface of the plate assembly housing.

* * * * *